(12) United States Patent
Blum et al.

(10) Patent No.: US 9,081,208 B2
(45) Date of Patent: Jul. 14, 2015

(54) ELECTRO-ACTIVE LENSES INCLUDING THIN GLASS SUBSTRATES

(75) Inventors: Ronald Blum, Roanoke, VA (US); Amitava Gupta, Roanoke, VA (US); William Kokonaski, Gig Harbor, WA (US); Venkatramani Iyer, Roanoke, VA (US)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 13/488,064

(22) Filed: Jun. 4, 2012

(65) Prior Publication Data

US 2013/0027655 A1    Jan. 31, 2013

Related U.S. Application Data

(60) Provisional application No. 61/492,433, filed on Jun. 2, 2011, provisional application No. 61/494,637, filed on Jun. 8, 2011, provisional application No. 61/513,708, filed on Aug. 1, 2011.

(51) Int. Cl.
  *G02F 1/1335* (2006.01)
  *G02C 7/08* (2006.01)

(52) U.S. Cl.
  CPC ..................................... *G02C 7/083* (2013.01)

(58) Field of Classification Search
  CPC ........ G02F 1/13; G02F 1/1333; G02F 1/1335
  USPC .................................................... 349/13, 158
  See application file for complete search history.

(56) References Cited

U.S. PATENT DOCUMENTS

| | | | |
|---|---|---|---|
| 5,310,577 A * | 5/1994 | Mase et al. | ...................... 427/164 |
| 6,619,799 B1 | 9/2003 | Blum et al. | |
| 6,626,532 B1 * | 9/2003 | Nishioka et al. | ................ 351/41 |
| 7,009,757 B2 | 3/2006 | Nishioka et al. | |
| 7,290,875 B2 | 11/2007 | Blum et al. | |
| 2005/0073739 A1 | 4/2005 | Meredith et al. | |
| 2005/0185135 A1 | 8/2005 | Blum et al. | |

(Continued)

FOREIGN PATENT DOCUMENTS

| WO | WO 2005/017572 | 2/2005 |
|---|---|---|
| WO | WO 2008/091896 | 7/2008 |

(Continued)

OTHER PUBLICATIONS

U.S. Appl. No. 61/492,433, filed Jun. 2, 2011.

(Continued)

*Primary Examiner* — Lucy Chien
(74) *Attorney, Agent, or Firm* — Sterne Kessler Goldstein & Fox P.L.L.C.

(57) ABSTRACT

An electro-active optical cell is described including a layer of electro-active material, a front glass substrate member, and a back glass substrate member. The optical cell is capable of independently providing changeable optical power with the application of an electrical potential. The cell is also configured to be affixed to an external surface of a plastic substrate and to provide the changeable optical power, with at least one of the front substrate or the back substrate of the optical cell being an outermost optical layer. The layer of electro-active material may have a thickness less than 10 μm, and the glass substrate members may each have a thickness approximately between 20 μm and 500 μm.

20 Claims, 4 Drawing Sheets

(56) References Cited

U.S. PATENT DOCUMENTS

2005/0237440 A1* 10/2005 Sugimura et al. ............... 349/13
2007/0159562 A1* 7/2007 Haddock et al. ................ 349/13

FOREIGN PATENT DOCUMENTS

| WO | WO 2009/045533 | 4/2009 |
| WO | WO 2012/167284 | 12/2012 |

OTHER PUBLICATIONS

U.S. Appl. No. 61/494,637, filed Jun. 8, 2011.
U.S. Appl. No. 61/513,708, filed Aug. 1, 2011.
The International Search Report corresponding to the PCT/US2012/040811 application.
Australian Patent Application No. 2012261826, Patent Examination Report No. 1, Issued Feb. 20, 2015, 3 pages.

* cited by examiner

ELECTRO-ACTIVE LENSES INCLUDING THIN GLASS SUBSTRATES

CROSS-REFERENCES TO RELATED APPLICATIONS

This application claims the benefit of U.S. Ser. No. 61/492,433 filed on Jun. 2, 2011; U.S. Ser. No. 61/494,637 filed on Jun. 8, 2011; and U.S. Ser. No. 61/513,708 filed on Aug. 1, 2011, the contents of which are incorporated by reference in their entireties.

BACKGROUND OF THE INVENTION

The present invention relates to electro-active lenses, which may include, for example, ophthalmic lenses such as spectacle lenses, and/or non-ophthalmic lenses, such as a camera lens, etc. More specifically, the present invention relates electro-active cells including one or more thin glass layers, as well as to lenses which may include such cells.

Electronic lenses and electronic focusing eyeglasses are known and now commercially available. U.S. Pat. Nos. 6,619,799; 7,290,875; 6,626,532; and 7,009,757 (the contents of which are hereby incorporated by reference herein for all purposes) are presented as selective examples of electronic focusing ophthalmic lenses and/or eyeglasses that teach how an electronic lens or electronic focusing eyeglasses are made.

Presently the only electronic focusing eyeglasses commercially available are retailing for about $1,250 for a pair which includes the electronic frames, electronic lenses, charger, and all coatings. There are two major components that drives up the cost of goods of such electronic focusing eyeglasses and both pertain to the cost of the electronic lenses. Presently the electronic lenses have to be made out of an expensive 1.67 optical grade plastic called MR 10 sold by Mitsui. This is because the index of refraction of the diffractive region and the liquid crystal must be closely matched when the electronic lens is turned off. In addition to a good index match in the off state, it is important to maintain a relatively small diffractive height (less than 4 microns ideally). This requires a relatively large average index of the LC needs, so that the change in index when the lens is activate is large enough to produce the desired amount of phase shift for a relatively thin layer of liquid crystal.

Because the diffractive region is located on the external front surface of the 1.67 back semifinished lens blank, the significant bulk of the material with the present electronic focusing lens is made from an expensive premium material. And because the index of the liquid crystal must closely match that of the 1.67 back, the material selection which can be used to make today's commercially available electronic focusing ophthalmic lens is very much limited.

Thus there is a pressing need for an ophthalmic focusing lens and/or electronic eyeglasses that allows for a much lower cost of goods and is material independent. By material independent it is meant allows for a plurality of different materials which comprises the bulk the electronic semi-finished lens blank.

Other factors to consider include the fact that, while plastic lenses are light weight, they have tendency to scratch. On the other hand, glass is highly scratch resistant but is heavy. Glass-plastic composite lenses have been tried in the past but have tended to fail due to thermal expansion differences causing delamination of the glass from the plastic.

Also, with electronic eyeglasses, the front lid is approximately 1.3 mm thick. For grooved lenses the groove is set at 1.3 mm from front thus the groove is located at the interface of the front lid optical substrate and the back optical substrate.

With regard to electronic spectacle lenses there is a need for improved and novel ways to create less expensive lens products that meet safety and durability standards.

BRIEF SUMMARY OF THE INVENTION

The invention disclosed herein provides a simplified way of constructing an electronic focusing ophthalmic lens, which can be materially independent of the lens blank. One significant aspect of the invention is that the liquid crystal cell is self contained, can be stand alone, and is made independent of the semi-finished lens blank to which it is later attached or affixed.

In addition, the invention disclosed herein provides for a much reduced cost of goods compared to today's only commercially available electronic focusing ophthalmic lens and/or electronic focusing eyeglasses. The invention disclosed herein provides for an ophthalmic focusing lens having material independence.

According to first aspects of the invention, an electro-active optical cell is provided including a layer of electro-active material, a front glass substrate member, and a back glass substrate member. In embodiments, the optical cell is capable of independently providing changeable optical power with the application of an electrical potential. In embodiments, the optical cell is configured to be affixed to an external surface of a plastic/polycarbonate substrate and to provide the changeable optical power, with at least one of the front substrate or the back substrate of the optical cell being an outermost optical layer (excluding coatings and other surface treatments).

In embodiments, a plurality of differently shaped, or configured, lens blanks may be provided for assembling with a standard electro-active optical cell.

In embodiments, one of the glass substrates may be conformal with a lens blank surface and/or one of the glass substrates may be parallel with a diffractive optic.

In embodiments, the optical cell may be configured such that front and rear surfaces are not parallel. For example, the front of the cell may have less curvature (i.e. be flatter) than the back of the cell. Such configurations may be beneficial, for example, in optimizing the form of the cell after it is fixed to a lens blank.

In embodiments, the layer of electro-active material has a thickness less than approximately 10 μm. In embodiments, either of the glass substrate members may have a thickness between, for example, 20 μm and 1000 μm, 20 μm and 500 μm, 100 μm and 500 μm, or 100 μm and 250 μm.

In embodiments, the cell may be configured to provide no optical power when the electrical potential is turned off.

In embodiments, the cell may have at least one of switchable optical power, tunable optical power, and changeable optical power, when the electrical potential is turned on.

In embodiments, the cell may be configured to be affixed to the front of a lens comprising fixed optical power. In alternative embodiments, the cell may be configured to be affixed to the back of a lens comprising fixed optical power.

In embodiments, one of the substrate members may be coated on an outer surface with a antireflection coating. In embodiments, one of the substrate members may be coated on an outer surface with a scratch resistant coating.

In embodiments, one of the substrate members may be capable of being surfaced and polished to create the front or back surface of an optical lens.

In embodiments, the electro-active material comprises liquid crystal.

In embodiments, at least one of the glass substrates may comprise a surface relief diffractive surface formed thereon. In embodiments, the electro-active cell may include a pixilated region.

In embodiments, at least one of the glass substrates may comprise a spherical curvature.

According to further aspects of the invention, a method of manufacturing an electro-active lens product is provided including providing a first optical layer having at least one convex or concave finished surface, and disposing a preformed electro-active optical cell opposite the at least one convex or concave finished surface such that the electro-active optical cell provides at least one of an outer anterior or posterior surface of a finished lens (not including coatings or other surface treatments). Such optical cells may include any of those described further herein.

In embodiments, the electro-active optical cell may include a layer of electro-active material having a thickness less than 50 μm, 10 μm or 5 μm, an anterior glass substrate member, and a posterior glass substrate member, and may be configured to provide a changeable optical power.

According to further aspects of the invention, a lens product is provided including a first optical layer including a convex anterior or concave posterior surface; and an electro-active cell including a first glass layer, a second glass layer, and a liquid crystal layer disposed between the first and second glass layers.

In embodiments, the first glass layer and the second glass layer each have a thickness between 20 μm and 1000 μm, 20 μm and 500 μm, 100 μm and 500 μm, or 100 μm and 250 μm.

In embodiments, the first optical layer is a semi-finished lens blank with an unfinished posterior or anterior surface.

In embodiments, the liquid crystal layer has a thickness less than 50 μm, 10 μm or 5 μm.

In embodiments, the second glass layer may have a thickness between 250 μm and 500 μm.

In embodiments, the electro-active cell may be configured to operate as a standalone cell capable of providing changeable optical power with the application of an electrical potential.

In embodiments, at least one of the first glass layer and the second glass layer may include a surface relief diffractive surface formed thereon.

In embodiments, at least one of the first glass layer and the second glass layer may include a spherical curvature.

In embodiments, the lens product may include a diffractive region and a refractive region in optical communication with one another. For example, the first optical layer may include a refractive region and the electro-active cell may include a diffractive region in optical communication with the refractive region.

Embodiments may include a plastic glass composite lens having a glass front surface of a thickness less than 200 microns. In embodiments, the lens may be an electronic focusing lens, or a static lens. In embodiments, the lens may be a progressive addition lens or a single vision lens.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

Aspects and features of the invention will be understood and appreciated more fully from the following detailed description in conjunction with the figures, which are not to scale, in which like reference numerals indicate corresponding, analogous or similar elements.

DETAILED DESCRIPTION OF THE INVENTION

Figure 1:
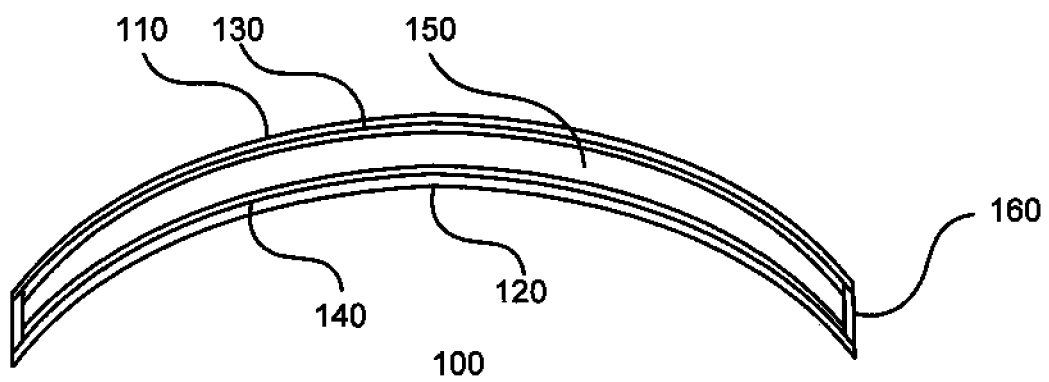
FIG. 1 shows a cross section of an exemplary electro-active cell according to first aspects of the invention.

It is understood that the invention is not limited to the particular methodology, protocols, and reagents, etc., described herein, as these may vary as the skilled artisan will recognize. It is also to be understood that the terminology used herein is used for the purpose of describing particular embodiments only, and is not intended to limit the scope of the invention. It also is be noted that as used herein and in the appended claims, the singular forms "a," "an," and "the" include the plural reference unless the context clearly dictates otherwise. Thus, for example, a reference to "a layer" is a reference to one or more layers and equivalents thereof known to those skilled in the art.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

The following preferred embodiments may be described in the context of exemplary active ophthalmic lens devices for ease of description and understanding. However, the invention is not limited to the specifically described devices and methods, and may be adapted to various assemblies without departing from the overall scope of the invention. For example, devices and related methods including concepts described herein may be used for other lenses and optical systems, and other apparatus with electro-active optical elements.

As used herein, an electro-active element refers to a device with an optical property that is alterable by the application of electrical energy. The alterable optical property may be, for example, optical power, focal length, diffraction efficiency, depth of field, optical transmittance, tinting, opacity, refractive index, chromatic dispersion, or a combination thereof. An electro-active element may be constructed from two substrates and an electro-active material disposed between the two substrates. The substrates may be shaped and sized to ensure that the electro-active material is contained within the substrates and cannot leak out. One or more electrodes may be disposed on each surface of the substrates that is in contact with the electro-active material. The electro-active element may include a power supply operably connected to a controller. The controller may be operably connected to the electrodes by way of electrical connections to apply one or more voltages to each of the electrodes. When electrical energy is applied to the electro-active material by way of the electrodes, the electro-active material's optical property may be altered. For example, when electrical energy is applied to the electro-active material by way of the electrodes, the electro-active material's index of refraction may be altered, thereby changing the optical power of the electro-active element.

The electro-active element may be embedded within or attached to a surface of an ophthalmic lens to form an electro-active lens. Alternatively, the electro-active element may be embedded within or attached to a surface of an optic which provides substantially no optical power to form an electro-active optic. In such a case, the electro-active element may be in optical communication with an ophthalmic lens, but separated or spaced apart from or not integral with the ophthalmic lens. The ophthalmic lens may be an optical substrate or a lens.

A "lens" is any device or portion of a device that causes light to converge or diverge (i.e., a lens is capable of focusing light). A lens may be refractive or diffractive, or a combination thereof. A lens may be concave, convex, or planar on one or both surfaces. A lens may be spherical, cylindrical, prismatic, or a combination thereof. A lens may be made of optical glass, plastic, thermoplastic resins, thermoset resins, a composite of glass and resin, or a composite of different optical grade resins or plastics. It should be pointed out that within the optical industry a device can be referred to as a lens even if it has zero optical power (known as plano or no optical power). However, in this case, the lens is usually referred to as a "plano lens". A lens may be either conventional or non-conventional. A conventional lens corrects for conventional errors of the eye including lower order aberrations such as myopia, hyperopia, presbyopia, and regular astigmatism. A non-conventional lens corrects for non-conventional errors of the eye including higher order aberrations that can be caused by ocular layer irregularities or abnormalities. The lens may be a single focus lens or a multifocal lens such as a Progressive Addition Lens or a bifocal or trifocal lens. Contrastingly, an "optic", as used herein, has substantially no optical power and is not capable of focusing light (either by refraction or diffraction). The term "refractive error" may refer to either conventional or non-conventional errors of the eye. It should be noted that redirecting light is not correcting a refractive error of the eye. Therefore, redirecting light to a healthy portion of the retina, for example, is not correcting a refractive error of the eye.

The electro-active element may be located in the entire viewing area of the electro-active lens or optic or in just a portion thereof. The electro-active element may be located near the top, middle or bottom portion of the lens or optic. It should be noted that the electro-active element may be capable of focusing light on its own and does not need to be combined with an optical substrate or lens.

The invention disclosed herein relates to various embodiments of electronic ophthalmic lenses also referred to as electro-active ophthalmic lenses. Ophthalmic lens as defined herein refer to spectacle eyeglass lenses, contact lenses, intraocular lenses, or any lens that focuses, transmits, directs, and or refracts light onto the retina of the user/wearer's eye. When used as a spectacle lens a tilt switch or similar sensor connected to an ASIC or micro controller may cause the spectacle lens to change its optical power.

Embodiments of the invention may generally include an electro-active cell which contains, by way of example only, liquid crystal (which is an electro-active material). The electro-active cell is free standing (meaning it is capable of changing optical power in a standalone manner) when electricity or an electrical potential is applied. The electro-active cell containing liquid crystal is named herein to be that of a liquid crystal cell.

While the electronic liquid crystal cell can be produced independently and in large quantity in most cases it is affixed to the front finished convex lens surface of a semi-finished lens blank. It should be pointed out that the liquid crystal cell can be applied also the back surface of a semi-finished lens blank when the back concave surface is finished and whereby the front convex surface is unfinished.

In certain other embodiments the liquid crystal cell can be applied to a non-finished surface of a non-finished lens blank. It should be pointed out that in all cases the electro-active cell has one of its substrate members affixed to a semi-finished lens blank, or lens and the other substrate member having an outer front surface that is exposed to air (not taking into account any coatings or treatments to its front surface etc.)

According to first aspects of the invention, an electro-active optical cell is provided, such as illustrated in FIG. 1. As can be seen in FIG. 1, an electro-active cell 100 may include a layer of electro-active material 150 (e.g. liquid crystal or electro-chromic material), a first glass substrate member 110, and a second glass substrate member 120. A seal 160 may be disposed around the electro-active material 150, and may be formed, for example, from either of first glass substrate member 110, or second glass substrate member 120, or from an independent spacer material inserted between the substrates.

In embodiments, the layer of the electro-active material 150 has a thickness less than approximately 10 μm, or less than approximately 5 μm. In embodiments, either of the glass substrate members 110, 120 may have a thickness between, for example, 20 μm and 1000 μm, 20 μm and 500 μm, 100 μm and 500 μm, or 100 μm and 250 μm. Thicker substrates may be used, for example, to allow for a particular front, or back, substrate to be surfaced and/or polished as the outer surface of a finished lens.

Electro-active cell 100 may also include layers 130, 140 which may include, for example, electrodes and/or alignment layers for influencing/activating the electro-active material 150. The electrodes may be a layer of ITO located on each substrate. These two layers of ITO form the electrodes needed to provide the electrical potential to switch, change, or tune the optical power of the liquid crystal lens cell. Typically, in the absence of an electric field between the electrodes, the liquid crystal molecules align in the same direction as the alignment direction. In the presence of an electric field between the electrodes, the liquid crystal molecules orient in the direction of the electric field. In an electro-active element, the electric field is perpendicular to the alignment layer. Thus, if the electric field is strong enough, the orientation of the liquid crystal molecules will be perpendicular to the alignment direction. If the electric field is not strong enough, the orientation of the liquid crystal molecules will be in a direction somewhere between the alignment direction and perpendicular to the alignment direction.

Either of layers 130, 140 may include, for example, pixilated electrodes, or other patterned electrodes for influencing and/or activating discreet portions of the electro-active material 150. In embodiments, the cell 100 may be configured to provide no optical power when the electrical potential is turned off. In embodiments, the cell 100 may have at least one of switchable optical power, tunable optical power, and changeable optical power, when the electrical potential is turned on.

Either of the outer surfaces of first glass substrate member 110 or second glass substrate member 120 may be configured to joining with a lens blank. Likewise, either of the outer surfaces of first glass substrate member 110 or second glass substrate member 120 may be configured to be surfaced and polished to create the front or back surface of an optical lens.

Electro-active cell 100 may be configured to be capable of independently providing changeable optical power with the application of an electrical potential. In embodiments, the electro-active cell 100 is configured to be affixed to an external surface of a plastic/polycarbonate substrate and to provide the changeable optical power, with at least one of the first substrate 110 or the second substrate 120 being an outermost optical layer (excluding coatings and other surface treatments).

In embodiments, electro-active cell 100 may be configured such that its front and rear surfaces are not parallel. For example, the front of the cell (e.g. first substrate 110) may have less curvature (i.e. be flatter) than the back of the cell (e.g. second substrate 120). Such configurations may be beneficial, for example, in optimizing the form of the cell after it is fixed to a lens blank.

In embodiments, one of the substrate members 110, 120 may include diffractive element (e.g. a surface relief diffractive) on a front or back surface thereof. In embodiments, one of the substrate members 110, 120 may include a spherical curvature. In embodiments, one of the substrate members 110, 120 may be coated on an outer surface with a antireflection coating. In embodiments, one of the substrate members 110, 120 may be coated on an outer surface with a scratch resistant coating.

In a preferred embodiment of the invention the electronic liquid cell is affixed to the front convex surface of the semifinished lens blank while the back unfinished surface of said semifinished lens blank is finished by way of surfacing and polishing and/or free forming or digital surfacing. In a preferred embodiment the liquid crystal cell is formed by way of a front substrate of glass member having a thickness ranging between 250 microns and 500 microns and a back substrate member of glass having a thickness which ranges between 250 microns and 500 microns.

In embodiments, one of the two glass substrates members may have a surface relief diffractive surface formed thereon and the other glass substrate member may be spherical in curvature. The formation of the surface relief diffractive on the glass surface can be by way of etching. In a preferred embodiment, the surface relief diffractive may be formed on the front convex surface of the back glass substrate member. However in another preferred embodiment, the surface relief diffractive may be formed on the back concave surface of the front glass substrate member. A thin layer (e.g. less than 10 microns) of liquid crystal is deposited and located on the top surface of the surface relief diffractive surface. In some cases this layer of liquid crystal may be, for example, less than 5 microns thick.

The glass substrate member having a diffractive surface area located thereon is comprised of an index of refraction which matches closely that of the liquid crystal when the electronic liquid crystal cell is turned off. An alignment layer is typically formed on the surface of the diffractive after it is coated with ITO. However, it should be noted that the alignment layer can be formed on the surface of the diffractive and the ITO can be deposited over the alignment layer.

The index of refraction of the opposite glass spherical substrate member can be that of any index of refraction.

In certain embodiments, an adhesive, which in most cases, but not all, is index matched to that of the refractive index of the liquid crystal when the liquid crystal cell is turned off (or the electronic focusing lens is turned off) and is applied such that the two glass substrates members become affixed to one another thus encapsulating the liquid crystal in between.

In other embodiments of the invention, the front glass substrate member and the back glass substrate member, after being coated with ITO and then SiO2, are bonded by way of laser fusion or anodic bonding. And in an additional embodiment of the invention, the front glass substrate member and the back glass substrate member, after being coated with ITO, are bonded by way of laser fusion or anodic bonding. In this additional embodiment of the invention, SiO2 is not used even though laser fusion and anodic bonding are utilized to secure the front glass substrate member to the back glass substrate member of the liquid crystal cell. For clarity, a liquid crystal cell is a type of electro-active cell.

As mentioned previously, a significant aspect of the invention is that the liquid crystal cell is self contained (can be stand alone) and is made independently of that of the semi-finished lens blank to which it is attached or affixed. This allows for the liquid crystal cell to be made in quantity and separately which allows for improved manufacturing efficiency and cost reduction. Further is should be understood that once the liquid crystal cell is affixed or attached to the semi-finished lens blank it is then known as an electronic semi-finished lens blank. And once the electronic semifinished lens blank is finished by way of surfacing and polishing, and/or free forming or digital surfacing the electronic lens blank is then known as an electronic focusing lens blank. Finally once the electronic focusing lens blank is edged or shaped into that of a lens capable of being mounted into an eyeglass frame it is known as an electronic focusing lens.

Given that the liquid crystal cell of the inventive ophthalmic electronic lens is self contained and works in a standalone manner it allows for being affixed to any optical grade plastic material and even glass. This allows for the inventive electronic lens as taught herein to utilize much less expensive optical grade materials that become the bulk of the electronic semi-finished lens blank; such as polycarbonate or even CR39, both of which are inexpensive optical grade materials for making ophthalmic lenses or eyeglasses.

In some embodiments, but not all, the liquid crystal cell has no optical power when electricity or the electrical potential is not applied or is removed. And has optical power when electricity or the electrical potential is applied. In these embodiments the two glass substrate members are parallel to one another and neither comprises any optical power. In certain embodiments the two parallel glass substrate members are curved to match the front convex curvature of the plastic semi-finished lens blank.

In other embodiments the two parallel glass substrate members are curved to match the back concave curvature of the plastic semi-finished lens blank. In certain other embodiments (which are not fail safe) the liquid crystal cell has optical power when electricity or the electrical potential is not applied or is removed, and has no optical power when electricity or the electrical potential is applied.

As used herein, the term dynamic means the optic is capable of changeable optical power as opposed to being a fixed static optical power. The add power region is the region of the electronic lens that dynamically increases plus optical power over and beyond the distance optical power. This change can be in steps of optical power or by way of continuous optical power.

Figure 2:
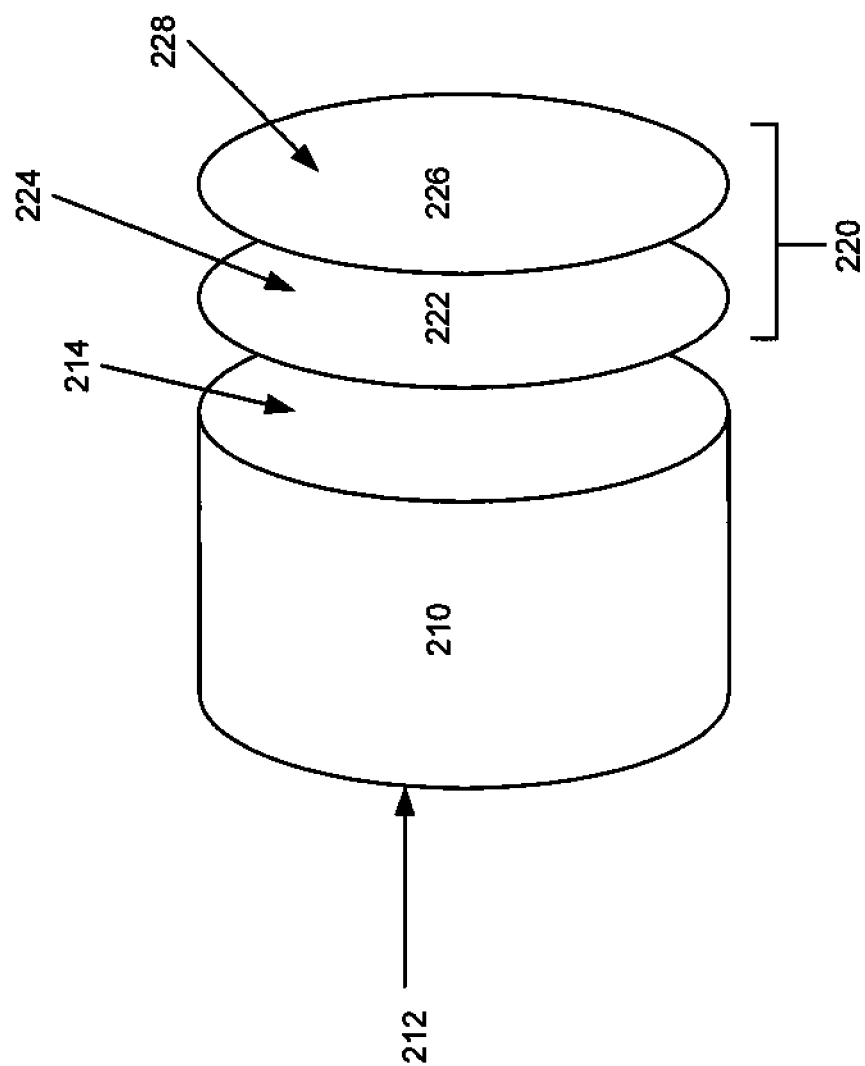
FIG. 2 shows a lens assembly including an electro-active cell according to further aspects of the invention.

As shown in FIG. 2, an exemplary embodiment of the invention may include a semi-finished lens blank 210, which may be, for example, an MR8 plastic, or other polycarbonate or plastic material.

A back surface 212 of the lens blank 210 may be unfinished, and a front surface 214 of the lens blank 210 may be shaped to a convex shape, suitable for joining with the back surface of an electro-active cell as described herein. The lens blank 210 may be manufactured in different sizes and/or material compositions to provide for a range of potential optical power. Thus, a plurality of differently shaped, or configured, lens blanks may be provided for assembling with a standard electro-active optical cell.

As also shown in FIG. 2, an electro-active cell 220 may include a back substrate member 222 with a front convex surface 224, and a front substrate member 226 with a convex front surface 228. The back surface of substrate member 222 may be concave and configured to join together, substantially conformally, with the front surface 214 of the lens blank 210. In such configurations, the front surface of the electro-active cell 220, e.g. the front surface of front substrate member 226, may be capable of being surfaced and polished to create the front surface of an optical lens. It should be noted that the electro-active cell 220 may include similar features and/or functionality to the cell 100 shown in FIG. 1, unless otherwise specified.

The electro-active cell 220 also includes a liquid crystal material (not shown) between the back and front substrate members, and, in embodiments, may also include one or more electrode and alignment layers, as well as a diffractive element.

In embodiments, the layer of the electro-active material may have a thickness less than approximately 10 µm, or less than approximately 5 µm. In embodiments, either of the substrate members 222, 226 may have a thickness between, for example, 20 µm and 1000 µm, 20 µm and 500 µm, 100 µm and 500 µm, or 100 µm and 250 µm.

In embodiments, the electro-active cell 220 may be pre-fabricated and form a stand-alone unit, which can be assembled to various lens blanks at the point of sale, or other locations. Other embodiments will also be described with reference to FIG. 2.

In embodiments, both of back substrate member 222 and front substrate member 226 may be made of glass. The front convex surface 224 of back substrate member 222 may include a diffractive element and/or a seal to contain the liquid crystal material. The use of two glass substrates has a number of advantages which may include, material independence of the substrates for the electro-active cell, globally accepted materials, reduced overall material and processing costs, allow for high-temperature processing, inherent scratch resistance, no need for metal molds. This allows for making an electronic focusing lens cell that is very thin; e.g. 150-200 microns thin. This is because the front and back substrates may be made with ~75-100 micron glass. The front and back substrates, with all internal layers, can be bonded together by way of, for example, adhesive, laser bonding, or melting. Such glass substrates may also flex to that of the lens blank curve, thus solving the problem of thermal expansion and contraction.

In embodiments, the convex front surface 228 of the front substrate member 226 may be spherical.

In embodiments, the order of the components shown in FIG. 2 may be reversed. That is, the electro-active cell 220 may be configured to be joined to the back of a lens blank. In such circumstances, the electro-active cell 220 may join, for example, to a concave back surface of lens blank 210, and the back surface of the electro-active cell 220 may be exposed to air. In such configurations, the back surface of the electro-active cell 220 may include a substrate that is capable of being surfaced and polished to create the back surface of an optical lens.

Figure 3:
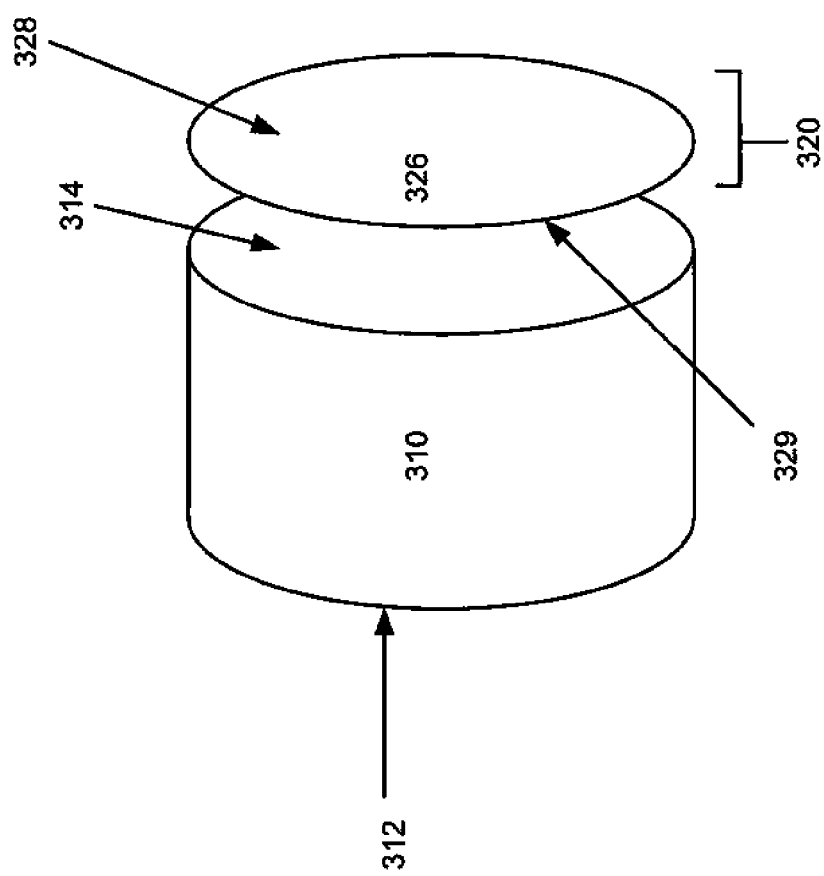
FIG. 3 shows another lens assembly including an electro-active cell according to further aspects of the invention.

Yet another alternative embodiment is depicted in FIG. 3. As shown in FIG. 3, embodiments may include a semi-finished lens blank 310, which may be, for example, an MR8 plastic, or other polycarbonate or plastic material. A back surface 312 of the lens blank 310 may be unfinished, and a front surface 314 of the lens blank 310 may be shaped to a convex shape, suitable for joining with the back surface of an electro-active cell as described herein. The lens blank 310 may be manufactured in different sizes and/or material compositions to provide for a range of potential optical power. In such configurations, the front surface of the electro-active cell 320, e.g. the front surface of substrate member 326, may be capable of being surfaced and polished to create the front surface of an optical lens.

As also shown in FIG. 3, an electro-active cell 320 may include a front substrate member 326 with a convex front surface 328. The back surface of substrate member 326 may be formed with a cavity for receiving the electro active material and various other elements of the electro-active cell, such as electrode and alignment layers, as well as a diffractive element. It should be noted that the electro-active cell 320 may include similar features and/or functionality to the cell 100 shown in FIG. 1, unless otherwise specified.

The electro-active cell 320 also includes a liquid crystal material (not shown) behind the front substrate member 326, and, in embodiments, may also include one or more electrode and alignment layers, as well as a diffractive element.

In embodiments, the layer of the electro-active material may have a thickness less than approximately 10 µm, or less than approximately 5 µm. In embodiments, the substrate member 326 may have a thickness between, for example, 20 µm and 1000 µm, 20 µm and 500 µm, 100 µm and 500 µm, or 100 µm and 250 µm.

In embodiments, the electro-active cell 320 may be pre-fabricated and form a stand-alone unit, which can be assembled to various lens blanks at the point of sale, or other locations. Other embodiments will also be described with reference to FIG. 3.

In embodiments, the front substrate member 326 may be made of glass. The front substrate member 326 may include a back concave surface 329 which may include a diffractive element and/or a seal to contain the liquid crystal material.

In embodiments, the convex front surface 328 of the front substrate member 326 may be spherical.

In embodiments, the order of the components shown in FIG. 3 may be reversed. That is, the electro-active cell 320 may be configured to be joined to the back of a lens blank. In such circumstances, the electro-active cell 320 may join, for example, to a concave back surface of lens blank 310, and the back surface of the electro-active cell 320 may include the substrate 326 exposed to air. In such configurations, the back surface of the electro-active cell 320 may include a substrate that is capable of being surfaced and polished to create the back surface of an optical lens.

As noted above, electro-active elements and/or cells as described herein may include individually addressable regions (e.g. "pixels") that may allow for selective activation of sub-regions of the electro-active material. Thus, spectacle lenses according to aspects of the invention can also provide for advanced control and tracking, such as responding to the eye translating across the spectacle lens, and controlling the lens based on the location of the pupil of the wearer's eye, e.g. to activate a particular progressive region etc.

In embodiments, the entire electro-active cell may be configured to turn on and off at the same time. In other cases, portions of the electro-active cell, when individually addressed, may be tuned to turn on or off at different times from one another. When such a design is used, an eye tracking system may be used to control such functions. For example, the pupil of the wearer's eye may be tracked to selectively activate regions of the electro-active material.

The diameter of each individually addressable region may be, for example, within at least about 0.25 $\mu m^2$. In certain cases, the electro-active material and/or corresponding electrodes may cover the majority of the electro-active cell and optical surface of the ophthalmic host lens that is within optical communication with the pupil of the eye of the wearer. In other embodiments, the electro-active material and/or corresponding electrodes may cover less than the majority of the electro-active cell and optical surface of the ophthalmic host lens that is in optical communication with the pupil of the eye of the wearer. This could be, for example, for the use of the invention with certain types of spectacle lenses and/or gaming or entertainment spectacles or eyewear.

The electro-active optical region can be of a structure that is pixilated or surface relief diffractive. When pixilated it can be individually addressed, when surface relief diffractive one common set (top and bottom) of electrodes can be used. The optical power can be made to be different if desired by way of the electrode design for when pixilated or the surface relief diffractive pattern. The optical design of a diffractive optical surface capable of providing plus optical power is known in the trade. It should be pointed out that when the index of refraction of the liquid crystal found within the optical power region is equal to that of the substrate on which it is located the optical power is mostly zero and the diffractive optical power region substantially disappears.

The optical power of each optical power region when activated can be within the range of +0.50D to +4.00D and most preferably within the range of +1.00D to +3.00D. If the electrical potential is applied such that it is not affecting all refractive optical power regions at the same time or of the same magnitude this would be accomplished by way of multiple insulated electrodes located on one or both substrates that are individually addressed.

These refractive regions can be designed, by way of example only, by way of structure of refractive curves or a Fresnel optical design. The optical design of a refractive optical surface capable of providing plus optical power is known in the trade. It should be pointed out that when the index of refraction of the liquid crystal found within the optical power region is equal to that of the substrate on which it is located the optical power is mostly zero and the refractive optical power region substantially disappears.

It should be pointed out that all measurements, dimensions, optical powers, shapes, figures, illustrations, provided herein by way of example and are not intended to be self limiting.

The liquid crystalline material discussed herein may be a nematic liquid crystal, a twisted nematic liquid crystal, a super-twisted nematic liquid crystal, a cholesteric liquid crystal, a smectic bi-stable liquid crystal, or any other type of liquid crystalline material. An alignment layer is a thin film, which, by way of example only, may be less than 100 nanometers thick and constructed from a polyimide material. The thin film is applied to the surface of substrates that comes into direct contact with liquid crystalline material. Prior to assembly of the electro-active element, the thin film is typically buffed in one direction (the alignment direction) with a cloth such as velvet. When the liquid crystal molecules come in contact with the buffed polyimide layer, the liquid crystal molecules preferentially lie in the plane of the substrate and are aligned in the direction in which the polyimide layer was rubbed (i.e., parallel to the surface of the substrate). Alternatively, the alignment layer may be constructed of a photosensitive material, which when exposed to linearly polarized 1N light, yields the same result as when a buffed alignment layer is used.

To reduce power consumption, a bi-stable liquid crystalline material may be used. A bistable liquid crystalline material may switch between one of two stable states with the application of electrical power (with one state being an activated state and the other state being a deactivated state). The bi-stable liquid crystalline material remains in the one stable state until sufficient electrical power is applied to switch the hi-stable liquid crystalline material to the other stable state. Thus, electrical power is only needed to switch from one state to the other and not to remain in a state. The bi-stable liquid crystalline material may switch to a first state when +5 volts or more is applied between the electrodes and may switch to a second state when −5 volts or less is applied between the electrodes. Of course other voltages, both higher and lower, are possible.

The liquid crystal may alter its refractive index over the visible spectrum by at least 0.1 units upon electrical activation. As used herein, the "visible spectrum" refers to light having a wavelength in the range of about 400-750 nm. A liquid crystal (LC) layer may include a guest-host mixture capable of altering the optical transmission of light upon electrical activation. As used herein, the optical transmission of a layer or device refers to the percentage of light energy that is transmitted through the layer or device and not lost to absorption or scattering. Preferably, the mixture is capable of altering the optical transmission by at least about 30%-99% upon activation. The liquid crystal layer may be pixilated as previously described, and may be electrically addressable in discrete portions of at least about 0.25 $\mu m^2$ without affecting the response of adjacent portions. The liquid crystal layer may be controllable by a computerized device, such as a processor and associated software, which may be capable of arbitrarily addressing multiple segments in a preprogrammed or adaptable manner. The software may be permanently embodied in a computer-readable medium, such as a special-purpose chip or a general purpose chip that has been configured for a specific use, or it may be provided by a digital signal. The software may be incorporated into a digital signal processing unit embedded into a vision correcting device.

In embodiments, such as where the electro-active cell is intended to provide a darkening or tinting function, the electro-active material may include a layer of liquid crystal doped with a dye material such as a dichroic dye. By doping the liquid crystal molecules with the dye material, the dye molecules align themselves with the liquid crystal molecules. The dye molecules are polar and rotate to align with an applied electrical field. The optical absorption of the dye material depends on the orientation of the individual dye molecules with respect to an incident optical wave. In a deactivated state with homogeneous (horizontal) alignment of the liquid crystal molecules, when the electric field between the electrodes is not strong enough, the dye molecules align with the alignment layers and the absorption of light through the liquid crystal is minimized or maximized, depending upon the relative orientation between the dipole moment and the direction of orientation of the dye molecule. In an activated state with homogeneous (horizontal) alignment of the liquid crystal molecules, when the electric field between the electrodes is strong enough, the dye molecules rotate and align with the orientation of the electric field, perpendicular to the alignment direction. In this orientation, the absorption of light though the liquid crystal is minimized. The opposite may be the case when a homeotropic (vertical) alignment of the liquid crystal is used such that absorption is minimized in a deactivated state and maximized in an activated state. A ferroelectric liquid crystalline material may also be used.

According to embodiments of the invention, two electrodes made of transparent electrodes by way of example only, such as indium tin oxide, may be provided. One electrode may be found on the inside layer of each substrate. It should be pointed out this invention also contemplates one electrode being located on the innermost surface of one substrate and the outermost surface of the second substrate or both electrodes being located on the outermost surface of both substrates.

A self contained sealed electronics module may be provided in various of the embodiments, and may comprise two substrates, two electrodes, coatings, and liquid crystal. Once the appropriate coatings, and electrodes are deposited on the common optical surfaces of the two substrates, the two substrates may then be affixed to one another by way of example only, an adhesive and/or glass laser fusion. The substrates may be hermetically sealed after the two substrates are affixed together and have the appropriate electronics applied for making the electro-active cell fully functional. Such a stand-alone optical unit can also be called a self contained sealed electronics module.

Figure 4:
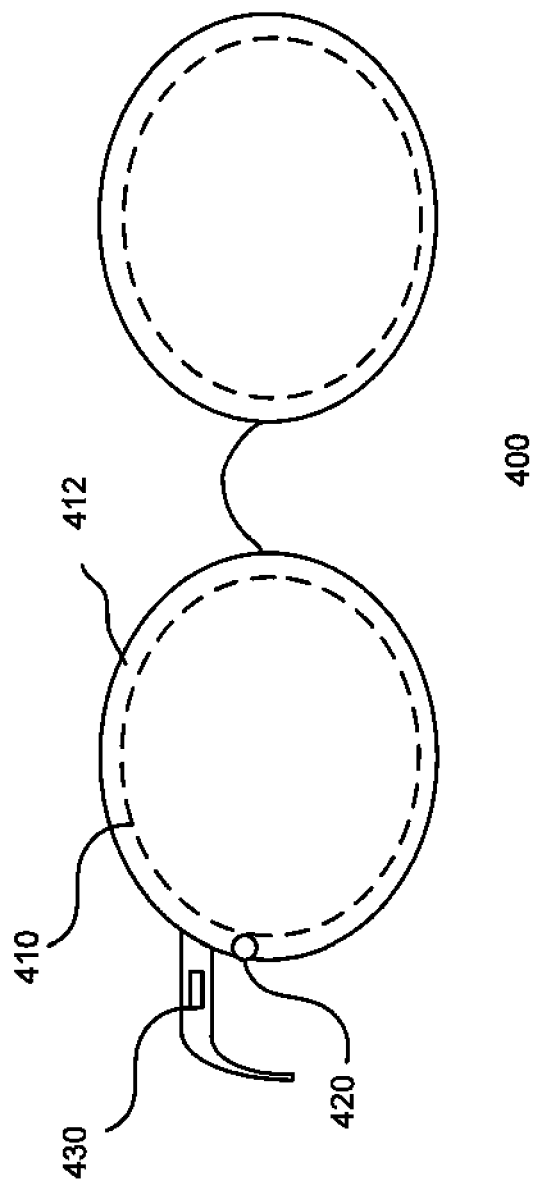
FIG. 4 shows spectacles including lenses with an electro-active cell according to further aspects of the invention.

Assembled lenses, including an electro-active cell as described herein, may be used in spectacles, such as shown in FIG. 4. A spectacle system 400 may included electro-active cells 410 attached to lens blanks. The spectacles 400 may also include sensor(s) 420 and a controller/power source 430.

Various exemplary lenses may include embedded sensors, such as sensor 420 shown in FIG. 4. The sensor may be, for example, a range finder for detecting a distance to which a user is trying to focus. The sensor may be light-sensitive cell for detecting light that is ambient and/or incident to the lens or optic. The sensor may include, for example, one or more of the following devices: a photo-detector, a photovoltaic or UV sensitive photo cell, a tilt switch, a light sensor, a passive range-finding device, a time-of-flight range finding device, an eye tracker, a view detector which detects where a user may be viewing, an accelerometer, a proximity switch, a physical switch, a manual override control, a capacitive switch which switches when a user touches the nose bridge of a pair of spectacles, a pupil diameter detector, or the like. The sensor may also include one or more micro electro mechanical system (MEMS) gyroscopes adapted for detecting a tilt of the user's head or encyclorotation of the user's eye.

The sensor may be operably connected to a lens controller, such as controller 430 shown in FIG. 4. The sensor may detect sensory information and send a signal to the controller which triggers the activation and/or deactivation of one or more dynamic components of the lens or optic.

The sensor, by way of example only, may detect the distance to which one is focusing. The sensor may include two or more photo-detector arrays with a focusing lens placed over each array. Each focusing lens may have a focal length appropriate for a specific distance from the user's eye. For example, three photo-detector arrays may be used, the first one having a focusing lens that properly focuses for near distance, the second one having a focusing lens that properly focuses for intermediate distance, and the third one having a focusing lens that properly focuses for far distance. A sum of differences algorithm may be used to determine which array has the highest contrast ratio (and thus provides the best focus). The array with the highest contrast ratio may thus be used to determine the distance from a user to an object the user is focusing on.

Some configurations may allow for the sensor and/or controller to be overridden by a manually operated remote switch. The remote switch may send a signal by means of wireless communication, acoustic communication, vibration communication, or light communication such as, by way of example only, infrared. By way of example only, should the sensor sense a dark room, such as a restaurant having dim lighting, the controller may cause changes to the lens that impact the user's ability to perform near distance tasks, such as reading a menu. The user could remotely control the lens or optic to increase the depth of field and enhance the user's ability to read the menu. When the near distance task has completed, the user may remotely allow the sensor and controller to act automatically thereby allowing the user to see best in the dim restaurant with regard to non-near distance tasks.

When the inventive embodiment is that of a spectacle lens the sensing is that of, by way of example only, a range finder, micro-accelerometer, tilt switch, micro-gyroscope, capacitor touch/swipe switch. Any one or all of these sensors can be built into the inventive ophthalmic host lens or that of the eyeglass frame that houses the inventive dynamic spectacle lens.

Lenses may also include controller connections for connecting the electro-active cell to an external power source or controller, a battery, a controller, and/or a power management system. Such components may be disposed completely, or partly, within a peripheral region of the lens, e.g. 412 in FIG. 4.

A power module may connect to electrodes of the electro-active cell by electrical connections and may be capable of generating an electric field between the electrodes by applying one or more voltages to each electrode. In some configurations, the power module may be part of the electro-active cell, or the lens blank. The module may be located outside the electro-active cell and connect to the electrodes using electrical contact points in the electro-active cell.

In embodiments, a surface of the electro-active cell may be configured in a substantially planar shape. In such configurations, the lens may be configured to include refractive index matching between the liquid crystal material included in the cell and the lens blank. This can be matched in the activated or inactivated state. In the index matched state, the cell may be configured to provide no additional optical power, whereas in the non-matched state, the cell may be configured to provide additional optical power. Such configurations may be beneficial, for example, in accommodating different pupil size depending on user needs, e.g. providing no additional power from the cell in a far-distance viewing situation where the pupil is relatively large, and providing additional optical power (e.g. in a limited region of the cell) in a near-distance viewing situation where the pupil is relatively small.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An electro-active optical cell comprising:
    a layer of electro-active material;
    a front glass substrate member; and
    a back glass substrate Member,
    wherein the optical cell is capable of independently providing changeable optical power with the application of an electrical potential, and
    wherein the optical cell is configured to be affixed to an external surface of a plastic substrate and to provide the changeable optical power, with at least one of the front substrate or the back substrate of the optical cell being an outermost optical layer.

2. The optical cell of claim 1, wherein the layer of electro-active material having a thickness less than 10 µm.

3. The optical cell of claim 1, wherein the glass substrate members each have a thickness between 20 µm and 500 µm.

4. The optical cell of claim 1, wherein the cell is configured to provide no optical power when the electrical potential is turned off.

5. The optical cell of claim 1, wherein the cell has at least one of switchable optical power, tunable optical power, and changeable optical power, when the electrical potential is turned on.

6. The optical cell of claim 1, wherein the cell is configured to be affixed to the front of a lens comprising fixed optical power.

7. The optical cell of claim 1, wherein the cell is configured to be affixed to the back of a lens comprising fixed optical power.

8. The optical cell of claim 1, Wherein one of the substrate members is coated on an outer surface with a antireflection coating.

9. The optical cell of claim 1, wherein one of the substrate members is coated on an outer surface with a scratch resistant coating.

10. The optical cell of claim 1, wherein one of the substrate members is capable of being surfaced and polished to create the back surface of an optical lens.

11. The optical cell of claim 1, wherein the electro-active material comprise liquid crystal.

12. The optical cell of claim 1, wherein at least one of the glass substrates comprises a surface relief diffractive surface formed thereon.

13. The optical cell of claim 12, wherein at least one of the glass substrates comprises a spherical curvature.

14. The optical cell of claim 1, wherein at least one of the glass substrates comprises a spherical curvature.

15. The electro-active optical cell of claim 1, wherein at least one of the first glass layer and the second glass layer comprises a spherical curvature.

16. An optical device, comprising:
    an optical cell comprising:
        a layer of electro-active material;
        a front glass substrate member; and
        a back glass substrate member,
    wherein the optical cell independently provides changeable optical power in response to application of an electrical potential, and
    wherein the optical cell is configured to be affixed to an external surface of a plastic substrate, with at least one of the front substrate or the back substrate of the optical cell being an outermost optical layer.

17. The optical device of claim 16, comprising the plastic substrate,
    wherein the optical cell is affixed to the external surface of the plastic substrate.

18. The optical cell of claim 16, comprising the plastic substrate, wherein the plastic substrate is a lens comprising fixed optical power, and wherein the cell is affixed to the front of the lens.

19. The optical cell of claim 16, comprising the plastic substrate, wherein the plastic substrate is a lens comprising fixed optical power, and wherein the cell is affixed to the back of the lens.

20. The optical cell of claim 16, wherein one of the front glass substrate member and the back glass substrate member is surfaced and polished to form the back surface of an optical lens.

* * * * *